(12) United States Patent
Silverman et al.

(10) Patent No.: US 8,333,353 B1
(45) Date of Patent: Dec. 18, 2012

(54) COMPACT, PORTABLE, TEMPORARY MOUNT FOR PORTABLE DEVICES

(75) Inventors: Branden Silverman, Canyon Country, CA (US); Sandra Ramirez, Canyon Country, CA (US)

(73) Assignee: Brandra, LLC, Encino, CA (US)

( * ) Notice: Subject to any disclaimer, the term of this patent is extended or adjusted under 35 U.S.C. 154(b) by 62 days.

(21) Appl. No.: 12/480,609

(22) Filed: Jun. 8, 2009

Related U.S. Application Data

(60) Provisional application No. 61/131,545, filed on Jun. 9, 2008.

(51) Int. Cl.
*A45D 42/14* (2006.01)

(52) U.S. Cl. .................. 248/205.6; 248/206.2; 24/331; 24/338

(58) Field of Classification Search ............ 248/205.6, 248/206.2; D14/253; 24/3.3; 362/190
See application file for complete search history.

(56) References Cited

U.S. PATENT DOCUMENTS

| | | | | |
|---|---|---|---|---|
| 4,196,882 A * | 4/1980 | Rognon | ................ | 248/205.9 |
| 4,222,680 A * | 9/1980 | Browning | ................ | 403/56 |
| 4,261,121 A * | 4/1981 | Coon | ................ | 40/332 |
| 4,277,864 A * | 7/1981 | Orson, Sr. | ................ | 24/327 |
| 4,279,396 A * | 7/1981 | Bendock | ................ | 248/205.5 |
| 4,349,246 A | 9/1982 | Binner | | |
| 4,624,539 A * | 11/1986 | King et al. | ................ | 359/872 |
| 5,033,528 A * | 7/1991 | Volcani | ................ | 160/351 |
| 5,666,702 A * | 9/1997 | Ming-Chieh | ................ | 24/510 |
| 5,845,885 A * | 12/1998 | Carnevali | ................ | 248/181.1 |
| 5,893,543 A * | 4/1999 | Emery et al. | ................ | 248/205.5 |
| 5,941,487 A * | 8/1999 | Keely | ................ | 248/231.51 |
| 6,010,102 A * | 1/2000 | Dillion, Jr. | ................ | 248/206.3 |
| 6,502,794 B1 * | 1/2003 | Ting | ................ | 248/206.2 |
| D484,395 S * | 12/2003 | Felsenthal | ................ | D8/373 |
| 6,736,531 B2 * | 5/2004 | Wallach | ................ | 362/414 |
| 6,779,765 B2 * | 8/2004 | Zheng et al. | ................ | 248/206.3 |
| 6,799,756 B2 * | 10/2004 | Degen | ................ | 269/96 |
| 6,804,866 B2 * | 10/2004 | Lemke et al. | ................ | 24/338 |
| 6,951,409 B2 * | 10/2005 | Hsien | ................ | 362/191 |
| 7,021,593 B1 * | 4/2006 | Fan | ................ | 248/206.2 |
| D524,976 S * | 7/2006 | Hodgson | ................ | D26/60 |
| D530,079 S | 10/2006 | Thomas et al. | | |
| 7,140,586 B2 | 11/2006 | Seil et al. | | |
| D533,174 S * | 12/2006 | Richter | ................ | D14/251 |
| 7,162,281 B2 | 1/2007 | Kim | | |
| D552,970 S * | 10/2007 | Brassard | ................ | D8/354 |
| 7,292,881 B2 | 11/2007 | Seil et al. | | |

(Continued)

OTHER PUBLICATIONS http://www.urbanbaby.com.au/epages/ecomm5000.sf/en_AU/?ObjectPath=/Shops/UrbanBaby/Products/ISASC/SubProducts/ISASC-0001, Animal Suction Clips, publication date unknown.

(Continued)

*Primary Examiner* — Terrell McKinnon
*Assistant Examiner* — Daniel J Breslin
(74) *Attorney, Agent, or Firm* — Barcelo, Harrison & Walker, LLP

(57) ABSTRACT

A compact, portable, temporary mount for portable devices capable of mounting such a device to any smooth, flat surface is described. The apparatus is compact, lightweight, and can be deployed and removed quickly and easily for user convenience. Certain embodiments of the present invention also provide means for multi-directional adjustment for obtaining optimal desired viewing angle for the portable device and can universally adapt to a wide variety of devices and device cases. Furthermore, multiple methods of attaching the present invention to a device or device case are described.

5 Claims, 9 Drawing Sheets

U.S. PATENT DOCUMENTS

| | | | |
|---|---|---|---|
| 7,296,771 B2 | 11/2007 | Kalis et al. | |
| 7,434,969 B2 * | 10/2008 | Ford et al. | 362/382 |
| 2006/0175522 A1 * | 8/2006 | Axel | 248/454 |

OTHER PUBLICATIONS http://www.edirectory.co.uk/pf/880/mia/pid/8494497, Clear Suction Clip, publication date unknown.

http://www.aircraftspruce.com/catalog/pspages/clips1.php, Put-it Suction Clip, publication date unknown.

http://www.aircraftspruce.com/catalog/avpages/rammounts.php, RAM Mounting Systems, publication date unknown.

http://catalog.belkin.com/IWCatProductPage.process?Product_Id=262890, TuneDok for iPod Nano, publication date unknown.

* cited by examiner

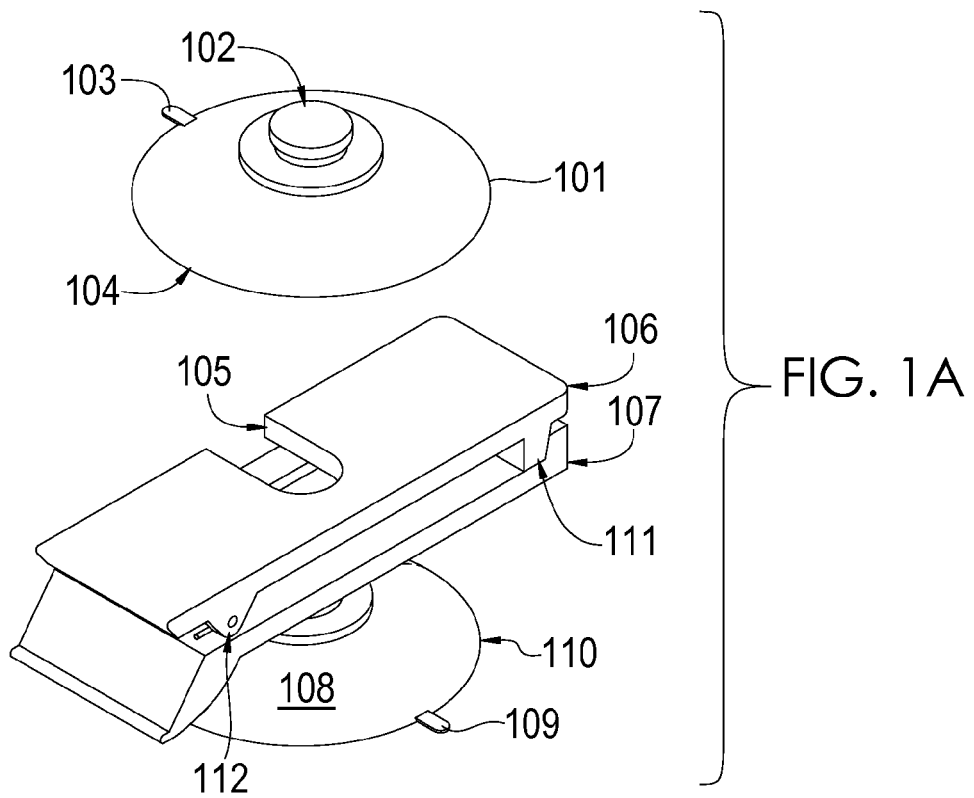
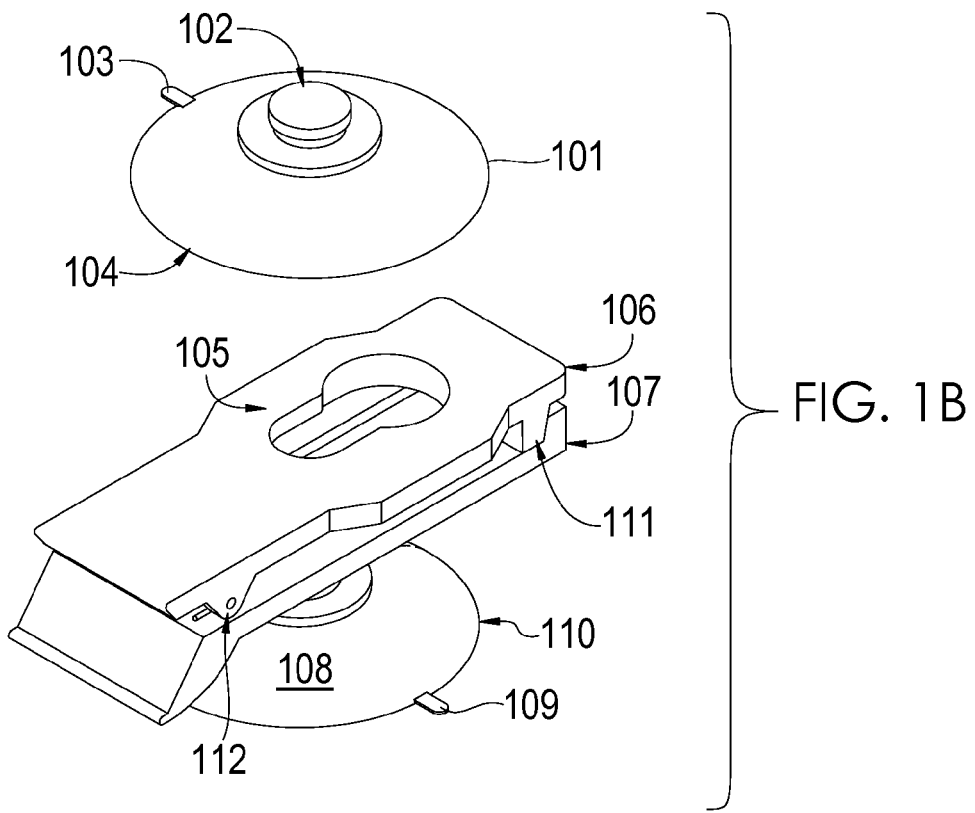

COMPACT, PORTABLE, TEMPORARY MOUNT FOR PORTABLE DEVICES

CROSS-REFERENCES TO RELATED APPLICATIONS

This application claims the benefit of Provisional Application Ser. No. 61/131,545, filed on Jun. 9, 2008, the contents of which are herein incorporated by reference in their entirety.

FIELD OF THE INVENTION

The present invention relates to the field of portable device accessories. More particularly, the present invention relates to a compact, temporary mount for portable devices and their cases that can secure such a device to a variety of objects and surfaces, including substantially any smooth, flat surface and can be deployed quickly and easily.

BACKGROUND OF THE INVENTION

In recent years, there has been a rapid increase in the production and sales of portable devices, such as Apple Inc.'s device offered under the IPOD trademark. As popularity of these devices has grown, so has the number of manufacturers and models. A wide range of functionality is available in portable devices. One common device is the cellular phone that may range from simple phones with only a key pad and minimal display to smart phones with a full color display, computer-like functionality, and the ability to play audio and video files. Another common type of portable device is the portable media device, which is available in a multitude of different shapes and sizes. The capability of these portable media devices has evolved from storing a small amount of audio media for playback to devices with much greater storage capacities, along with the addition of video capability. Users now have the option of downloading, storing, and viewing relatively large amounts of video, e.g. movies, television shows, music videos, etc. Many more relatively advanced cellular phones, or smart phones, now also include these capabilities. Portable devices include not only cellular phones and portable media devices, but also a broad range of electronic devices that are small and light enough to be carried with a user and temporarily mounted to a surface for use at a remote location.

As increasing numbers of new models of these portable devices include some video capability, downloadable video media designed for these devices is becoming increasingly available. Users can download media of their choice, e.g. their favorite television shows, and view the media on the go with their portable device. This technology is becoming more affordable as time goes on, thus increasing the popularity of these devices.

Numerous manufacturers produce accessories for portable devices such as protective cases, decorative pouches, and clips for securing devices to clothing or armbands. The vast majority of these accessories are specific to individual models of devices. They do, however, include similar features, such as clips, or slots for use with various straps, e.g. armbands. Many cellular phone cases utilize a removable clip with a flange and channel design. Some protective cases are made from rigid plastic and/or soft rubber and do not provide means attachment, so users still must carry their device in their hand or in a pocket. None of these protective or decorative cases provide a means of securing the device to a smooth, flat surface for the user's viewing convenience. A need therefore exists to provide a compact, portable, temporary mount for removably attaching a portable device to a variety of objects and surfaces, including smooth surfaces.

Exercise has become an important regular aspect in the lives of a large segment of the population, and portable devices are commonplace in fitness centers. As video capability becomes more widely available in portable devices, users can benefit from an improved way of enjoying this feature conveniently while exercising. While the popularity, availability, and variety of portable devices have experienced exponential growth in the past several years, and there are a multitude of manufacturing companies designing and producing a wide variety of accessories compatible with these devices, there are currently no compact, portable products designed to temporarily secure portable devices in a way that would enable a user to view the media on their devices "hands-free" while engaged in an activity such as using a piece of exercise equipment, e.g. treadmill, stair climber, elliptical, stationary bicycle, etc. A need exists for a temporary mount to secure a portable device in a position to provide easy accessibility and a desirable viewing angle to the device display to allow the user to interface with the device and to listen to audio or watch video in a remote location, including while exercising.

Multiple companies have designed mounts to secure portable electronic devices in vehicles. These mounts typically are not designed to be compact and in some cases are only meant for use in a vehicle, and most are specific to a particular device. A need therefore exists to provide a compact, portable, temporary mount that is universally usable with a variety of portable devices and removably attachable to a variety of surfaces and objects.

Thus, there exists a need for a product that can enable a user to conveniently enjoy their video media or to interact with the controls or display of a portable device to access its functions while engaged in other activities. As there is a large variety of portable devices, and an even larger variety of cases, clips, protective covers, and decorative sleeves, in distribution, it can also be appreciated that there exists a need for a product that can be adapted for use with a vast majority of these different styles of products. It is desirable to address the limitations in the art.

SUMMARY

The present invention meets the above described needs. More particularly, in certain embodiments, a portable device holder provides users a convenient way of using their portable devices, including video functions, while engaged in activities such as the use of cardio-exercise equipment, e.g. treadmills, stair climbers, ellipticals, stationary bicycles, etc. In certain embodiments, a portable device holder can be universally adapted to support a variety of different portable device cases or devices themselves and provides means for adjustment to obtain a desired viewing angle to a device display and/or controls. In certain embodiments, the invention utilizes suction to create a secure, temporary mount to any smooth flat surface and is easily deployed, removed, and carried by the user.

The following is a summary of certain embodiments of a portable device holder and is not intended to limit the features added or omitted. In certain embodiments, a portable holder for a portable device comprises a first retaining clip for removably attaching the portable holder to an object, the first retaining clip comprising a first end, a mount side, a device side, and a hinge pivotably coupling the mount side to the device side proximate the first end of the first retaining clip; a first suction cup adjustably mounted to the mount side, the first suction cup for removably attaching the portable device holder to a first surface, the adjustable mounting for adjusting the orientation of the portable device holder relative to the first surface; and a second suction cup removably mounted to the device side for removably attaching the portable device holder to a selected one of a portable device or a portable device case.

In certain other embodiments, a portable device holder comprises a first retaining clip for removably attaching the portable device holder to an object, the first retaining clip comprising a first end, a mount side, a device side, and a hinge pivotably coupling the mount side to the device side proximate the first end of the first retaining clip; a first suction cup adjustably mounted to the mount side, the first suction cup for removably attaching the portable device holder to a first surface, the adjustable mounting for adjusting the orientation of the portable device holder relative to the first surface; and the device side having a cut-out section for alternately receiving a flange from a selected one of a second suction cup, a portable device, or a portable device case.

In certain other embodiments a portable holder comprises a first retaining clip for removably attaching the portable holder to an object, the first retaining clip comprising a first end, a mount side, a device side, the mount side pivotally coupled to the device side proximate the first end of the first retaining clip; a first suction cup adjustably mounted to the mount side, the first suction cup for removably attaching the portable device holder to a selected one of a portable device or a portable device case and for adjusting the orientation of the portable device relative to the portable holder to provide a user-selected viewing angle to a front surface of the portable device; and a second suction cup removably mounted to the device side for removably attaching the portable device holder to a first surface.

The device side may include a cut-out section for alternately receiving a flange from a selected one of the second suction cup, a portable device, or a portable device case. The cut-out section optionally may be u-shaped or key-hole shaped. The cut-out section may be sized to removably engage a corresponding flange of a selected one of a portable device case or a portable device to prevent the removal of the selected one of a portable device case or a portable device in the absence of user applied force, whereby the selected one of a portable device case or a portable device can be removably coupled to the first surface. The second suction cup may comprise a neck portion with an integral flange that removably engages the cut-out section and a suction cup portion for removably attaching the portable device holder to a selected one of a portable device case or a portable device. The second suction cup may be removably mounted to the device side by removably engaging the flange of the second suction cup in the cut-out section.

In some embodiments, the portable holder may include a biasing means coupled to the hinge for biasing the first retaining clip in a closed position and a propping arm for selectably propping the retaining clip in an open position against the biasing means to adjust the orientation of the selected one of a portable device or a portable device case relative to the first surface. Optionally, the first suction cup may be adjustably mounted to the mount side by a ball-and-socket joint. Alternative embodiments may include a different style of joint or no joint at all. The second suction cup may be removably attached to a selected one of a portable device case or a portable device, thereby removably coupling the selected one of a portable device case or a portable device to the first surface.

As previously stated, the present invention meets the following objectives that have not been met: a compact, portable, temporary mount that enables users to view their portable device while engaged in activities, such as exercise, and a mount for portable devices that can be easily stored in a pocket or clipped on a user's clothing for maximum convenience. Additionally, certain embodiments of a portable device holder provide a compact, portable mount that can universally adapt to a multitude of existing devices and device cases, and that can be easily adjusted by the user for optimal viewing angle.

BRIEF DESCRIPTION OF THE SEVERAL VIEWS OF THE DRAWINGS

FIGS. 1A-1B depict perspective views of a compact, portable, temporary mount for portable devices, according to an embodiment of the invention. The small, removable suction cup is shown detached. FIG. 1A shows a U-shaped cut-out section. FIG. 1B shows a keyhole-shaped cut-out section.

FIG. 7 depicts the embodiment of FIG. 1B attached to a device or device case with an attached flange. The flange hangs interlocked in the cut-out section of the retaining clip, securing the device to the embodiment of FIG. 1B.

FIG. 8 depicts the upper, removable suction cup of the embodiment of FIG. 1B being utilized to attach the embodiment of FIG. 1 directly to a device or device case with a flat rigid back that has no other means of attachment. The upper suction cup is removably attached to the cut-out on the device-side of the retaining clip of the embodiment of FIG. 1 and attaches the device utilizing suction.

FIG. 9 depicts the embodiment of FIG. 1B attached to a style of portable device case that has substantially parallel slots in the back of the case. The device side of the clip is inserted through the slots, attaching the device securely to the portable device holder. Parallel slots may be added to any case constructed of a soft material if means of attachment are not included in the design of the case.

FIG. 10 depicts the embodiment of FIG. 1B attached to a device or device case that is equipped with a clip. The clip of the device or device case is interlocked with the device-side of the clip of the embodiment of FIG. 1B, providing secure attachment.

FIG. 11 depicts a side perspective of the embodiment of FIG. 1B in use utilizing the upper, removable suction cup as a method of attachment to the device.

FIG. 12 depicts a side perspective of the embodiment of FIG. 1B in use utilizing the method of attachment to a device or device case designed with a clip.

FIG. 13 depicts a perspective view of the embodiment of FIG. 1B in use, attached to the display screen of a piece of cardio-exercise equipment.

DETAILED DESCRIPTION

Figure 2:
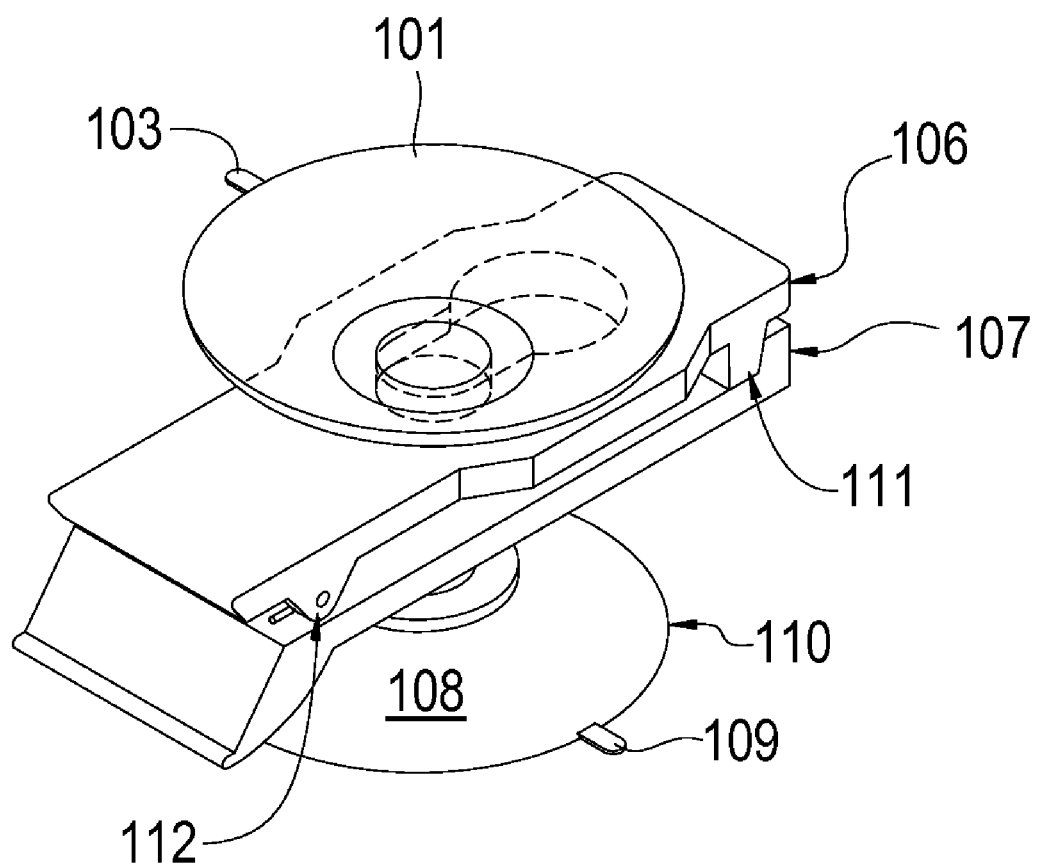
FIG. 2 depicts a perspective view of the embodiment of FIG. 1B with the upper removable suction cup attached.

The present invention will now be described in detail with reference to certain embodiments thereof, as illustrated in the accompanying drawings. In the following description, numerous specific details are set forth in order to provide a thorough understanding of the present invention. It will be apparent, however, to one of ordinary skill in the art, that the present invention may be embodied without some or all of these specific details. The methods of use for the present invention are not intended to be limited by the examples that are herein described in detail. In some instances, well known components of the invention and well known manufacturing processes are not described in detail so not to unnecessarily obscure the present invention. Unless otherwise indicated, the same reference numbers will be used throughout the drawings and the following description to refer to the same or like parts.

FIGS. 1A and 1B depict an embodiment of a portable device holder 100 with the upper, removable suction cup 101 detached. In these certain embodiments, the portable device holder 100 comprises a retaining clip assembly comprised of two opposing sides; a device side 106 and a mount side 107. These two components may be connected by a biasing means 112. One of ordinary skill in the art will recognize that the biasing means 112 may comprise a spring-hinge or other biasing means using any of a variety of methods of obtaining biasing force, e.g. coiled metal wire, curved metal band, etc. The retaining clip may further include a protruding ridge 111 on each of the opposing inner sides to help align the clip and help secure the device or device case when particular methods of attachment are used. The mount side of the clip 107 may be attached to the mounting suction cup 108. The mounting suction cup may be used to attach the retaining clip to a desired surface. Alternately, the retaining clip itself may be used to attach the compact, portable, temporary mount to a surface. Alternately, the retaining clip may be used to temporarily attach the compact, portable, temporary mount to an object, for example, a bag or article of clothing, for storage or transport. The device side 106 may include a cut-out section 105 for alternately receiving a flange from a selected one of the second suction cup, a portable device, or a portable device case. FIG. 1A shows a U-shaped cut-out section. FIG. 1B shows a keyhole-shaped cut-out section.

FIG. 2 depicts an embodiment of the portable device holder 100 with the relatively smaller, upper, removable suction cup 101 attached. This small, removable suction cup 101 may be made of a rubber material, such as silicone, that provides adequate flexibility over the cup portion 104 to provide suction and adequate rigidity in the flange portion 102 to allow a secure fit when attached to the cut-out section 105 on the device side of the clip 106. The flange portion 102 of this small, removable suction cup 101 may be appropriately sized to mate securely with the cut-out section 105. Although the cut-out section 105 is depicted as substantially U-shaped in FIG. 1A, one of ordinary skill in the art will recognize that a variety of other shapes may be used for the cut-out section without departing the scope of the present invention. For example, the cutout section may be keyhole shaped as shown in FIG. 1B, comprising a first opening larger than the flange of the small, removable suction cup to permit the flange to be inserted into the first opening and a second opening connected to the first opening and sized to engage the flange of the small, removable suction cup when the flange is removably engaged therein. Various other shapes may be used to create a cut-out section that removably engages the flange of the small removable suction cup so as to prevent the removal of the small, removable suction cup in the absence of user applied force. A small tab 103 may optionally protrude from the small removable suction cup 101 near the edge to allow ease of removal by the user. This small, removable suction cup 101 may be utilized in certain methods of attaching particular types of device cases or to attach directly to a device.

Figure 3:
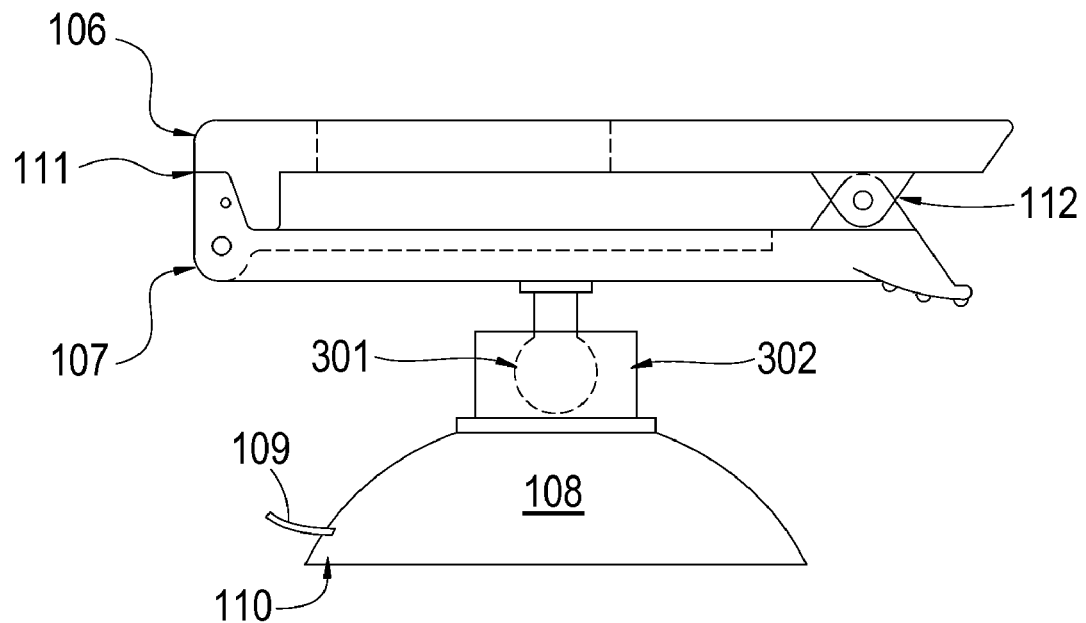
FIG. 3 depicts a side view of the embodiment of FIG. 1B. The upper removable suction cup is not shown.
Figure 4:
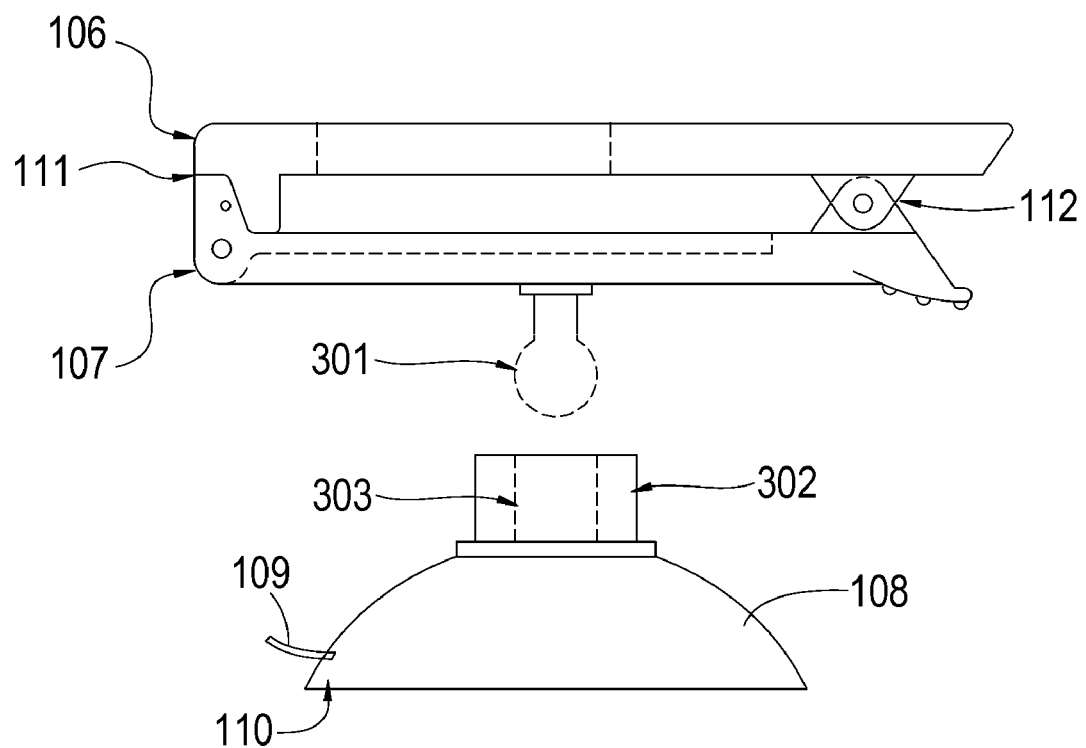
FIG. 4 depicts a side view of the embodiment of FIG. 1B in a disassembled state in order to show detail of the ball-and-socket joint.

FIG. 3 and FIG. 4 depict side views of an embodiment of a portable device holder 100 including a ball-and-socket joint. The small, removable suction cup 101 is not shown. Both the device side of the clip 106 and the mount side of the clip 107, including the incorporated ball portion 301 of the joint, may be made of, but are not limited to, a rigid plastic material, e.g. polycarbonate. These components may be made in a variety of colors. The mounting suction cup 108 may be made from a rubber material, e.g. silicone, which provides adequate flexibility over the cup portion 110 to provide strong suction, and adequate rigidity in the neck 302 that contains the incorporated socket portion 303 of the ball-and-socket joint. A small tab 109 may protrude from the mounting suction cup 108 near the edge to allow ease of removal by the user.

The ball-and-socket joint may provide the user substantial adjustment capability to select a desirable viewing angle. The ball portion 301, and the cavity, or socket portion 303, in the neck 302 of the mounting suction cup 108 may be sized appropriately to provide a tight tolerance ensuring adequate friction between the two materials to prevent movement of the joint in the absence of user applied force. Alternate embodiments may not include a joint or may include a different style of joint, such as, but not limited to, a simple hinge which pivots on a single axis, or a compound hinge which pivots on more than one axis. One of ordinary skill in the art will recognize that other joints that provide adjustability may be used without departing from the scope of the present invention.

Figure 5:
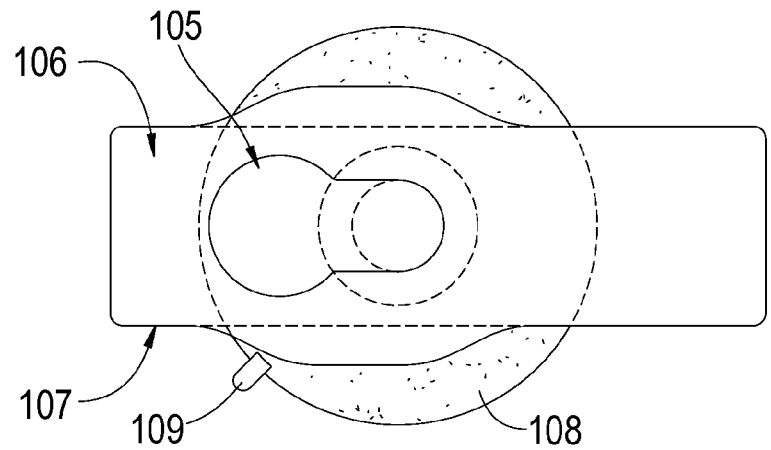
FIG. 5 depicts a top view of the embodiment of FIG. 1B.
Figure 6:
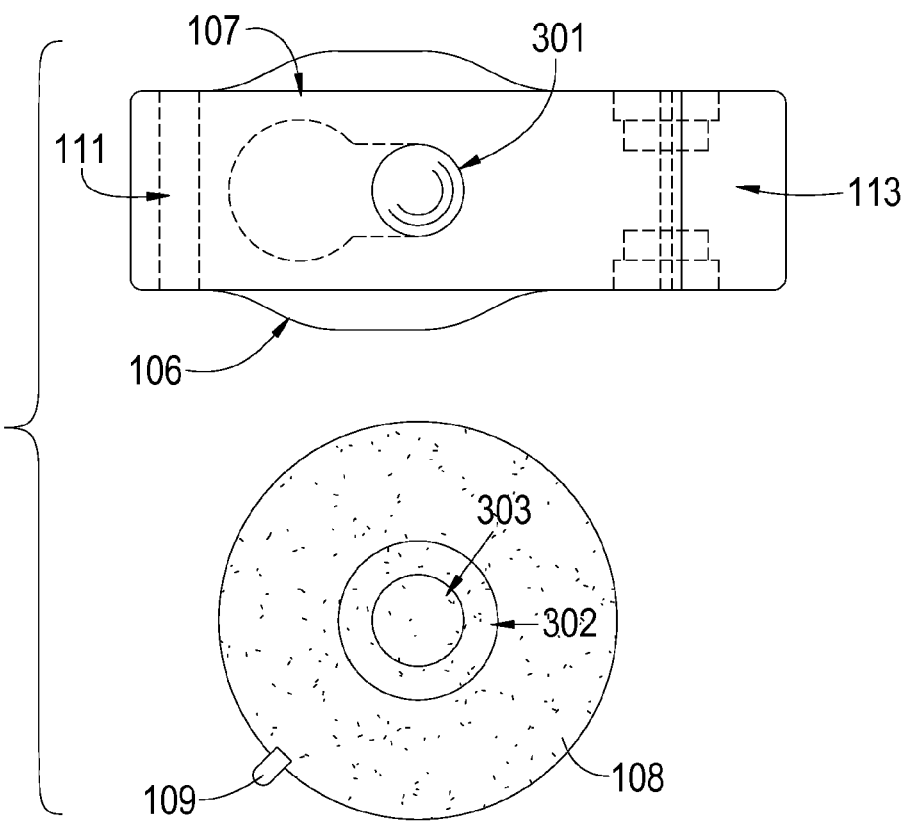
FIG. 6 depicts a top view of the embodiment of FIG. 1B in a disassembled state in order to show detail of the ball-and-socket joint.

FIG. 5 and FIG. 6 depict top views of a portable device holder according to an embodiment of the present invention. The general size and shape of a portable device holder 100 can be varied, yet still be capable of supporting a wide variety of portable devices, while remaining compact enough to be easily portable in a user's pocket or clipped to an article of clothing, such as the user's waistband.

The methods for use of the present invention will now be discussed in detail. In certain embodiments, a portable device holder may be universally adaptable to a variety of different styles of devices and device cases. Alternate embodiments of a portable device holder may be specifically designed to attach directly to particular models of portable devices by means of an appropriately sized bracket or cradle to mate with the housing of the particular model of device.

FIGS. 7-10 illustrate a variety of methods that may be used to adapt the certain embodiments of a portable device holder to different styles of portable device cases and devices themselves. For the sake of clarity, only the device side of the portable device holder's clip is shown.

Figure 7:
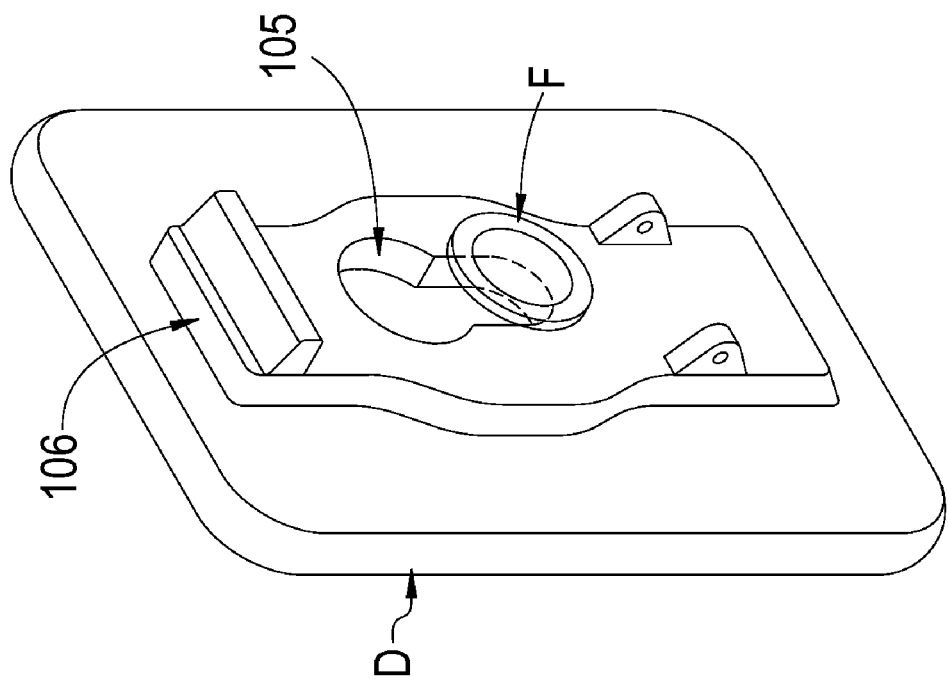

FIG. 7 depicts an embodiment for utilizing a portable device holder 100 in conjunction with a portable device or device case D that has an attached flange F. A number of manufacturers incorporate a flange F in their designs for use with a detachable belt clip. The size and shape of the flange F is generally consistent regardless of the manufacturer. The size and shape of the cut-out section 105 on the device side of the clip 106 may be appropriate to receive the flange F and secure the portable device holder 100 to the device or device case D.

Figure 8:
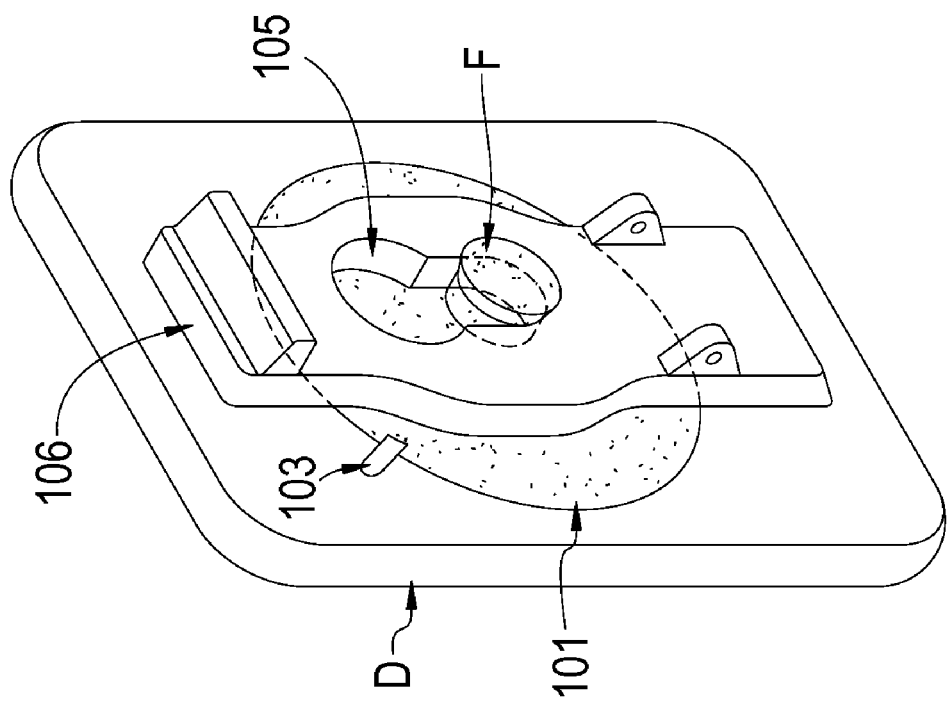
FIG. 7-FIG. 10, illustrate a variety of methods that may be used to adapt the embodiment of FIG. 1B of the present invention to different styles of portable device cases and devices. For the sake of clarity, only the device side of the retaining clip of the embodiment of FIG. 1B is shown.

FIG. 8 depicts an embodiment for attaching a portable device holder 100 directly to a device or device case D having a back that is substantially rigid and flat. The device or device case D may have no other means of attachment or the small, removable suction cup may provide an alternate means of attachment to those provided by or with the device or device case. In this method of attachment, the small, removable suction cup 101 may be utilized by removably securing it to the cut-out section 105 on the device side of the clip 106 as illustrated. The device or device case D may be attached to the small, removable suction cup 101 utilizing suction. The device or device case D may be easily removed by pulling on the small tab 103 on the small, removable suction cup 101. As described above, the small, removable suction cup may comprise a flange F sized for removably engaging the cut-out section to prevent the removal of the small, removable suction cup in the absence of user applied force. By sizing the flange of the small, removable suction cup to be removably attached to the cut-out section, which may itself be sized to fit industry-standard flanges attached to devices or device cases, the same embodiment of a portable device holder may be used interchangeably with devices or devices cases with no other means of attachment (via the small, removable suction cup engaging the cut-out section and attaching the portable device holder by suction to the device or device case) or devices or devices cases with integral flanges (via direct engagement of the cut-out section by the device or device case flange).

Figure 9:
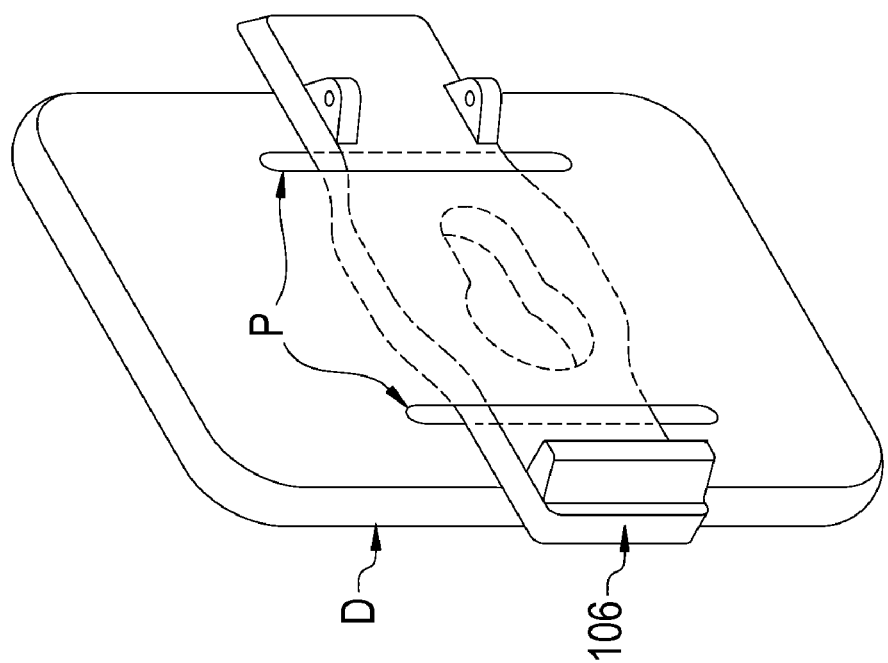

FIG. 9 depicts an embodiment for attaching a portable device holder 100 to a device case D that has substantially parallel slots P on the back. These parallel slots P are included in many designs of device cases D for the purpose of attaching to a strap, such as an armband. Whether these cases are manufactured using leather, nylon, rubber, or a combination of materials, many employ a similar design of parallel horizontal or vertical slots on the back of the case. These slots enable a strap to be passed through to secure the device. Certain embodiments of a portable device holder can adapt to these case designs, as the size and shape of the invention's clip allows the device-side of the clip to pass through these slots, securing the device to the portable device holder. This type of case may be attached to certain embodiments of the portable device holder 100 by sliding the device side of the clip 106 through the parallel slots P as illustrated to provides a secure attachment of the device case D to the portable device holder 100. The small, removable suction cup need not be used for this method of attachment. For versions of portable device cases lacking means of attachment, the user may elect to create a pair of substantially parallel slots in the rear surface of the portable device case and employ the previous method of attachment to utilize certain embodiments of the portable device holder with these types of cases.

Figure 10:
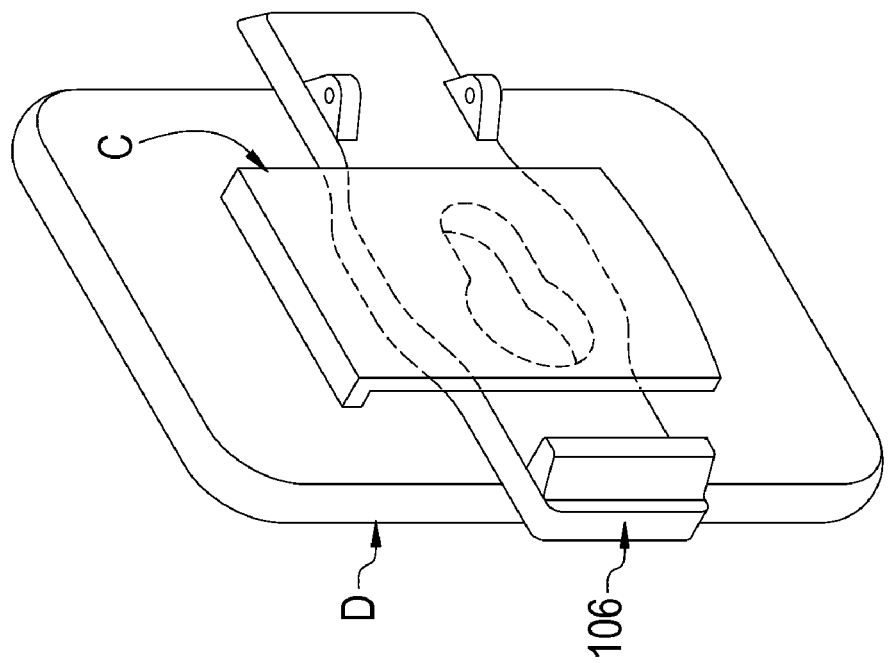

FIG. 10 depicts an embodiment for attaching a portable device holder 100 to a device or device case D that is equipped with a clip C. The clip C of the device or device case D may be interlocked with the device side of the clip 106 of the portable device holder 101 as illustrated. This provides a secure attachment of the device or device case D to certain embodiments of the portable device holder 100.

Regardless of the method of attachment used to adapt the portable device holder to the portable device or device case, the user may mount the device to any smooth, flat surface of their choice, e.g. the display screen of a piece of cardio-exercise equipment. Ensuring the surface is reasonably clean and free of obstructions, the mounting suction cup may be pressed onto the surface, thus creating a secure, temporary mount. The device can then be adjusted for a desired viewing angle by manipulating the portable device holder through action of the ball-and-socket joint. The portable device holder may be easily removed from the surface by pulling the small tab attached to the outer edge of the mounting suction cup and can be removed from the device or device case. When not in use, the portable device holder can be easily stored in the user's pocket or clipped to clothing, such as the user's waistband.

Figure 12:
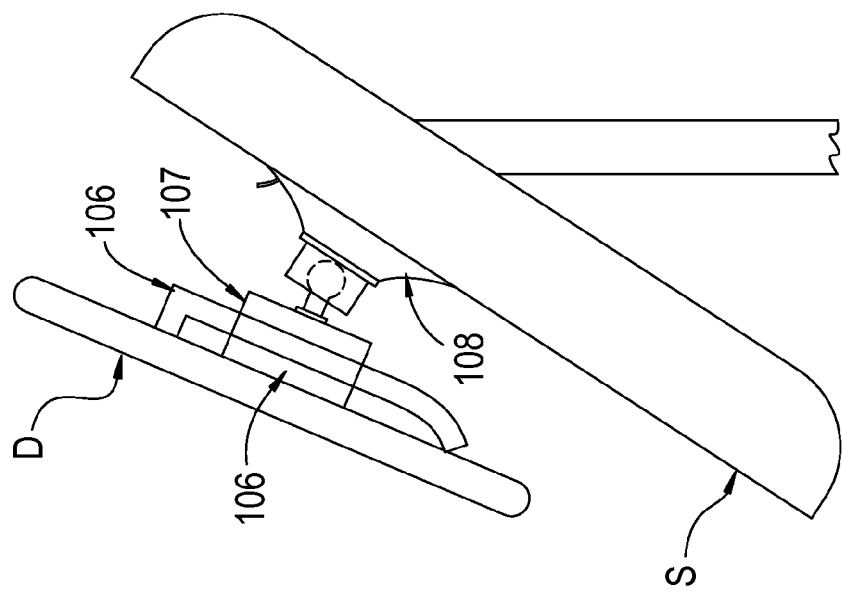
FIGS. 11-13 show the embodiment of FIG. 1B in use, mounted to a surface. A display screen of a piece of cardio-exercise equipment is used as an example of a usable surface, however, this example is not intended to limit the scope of the variety of surfaces on which a portable device holder can be mounted. In addition, not all methods of attachment are shown.
Figure 11:
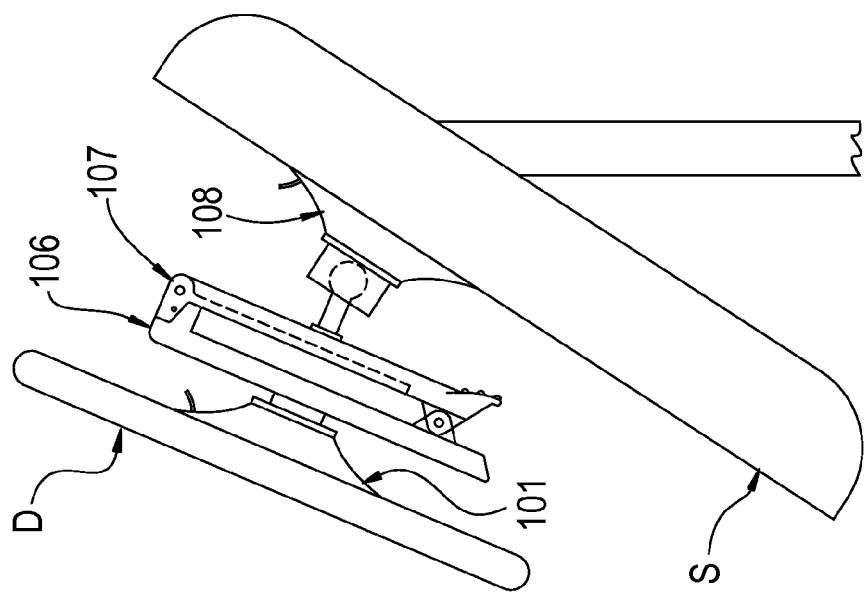
Figure 13:
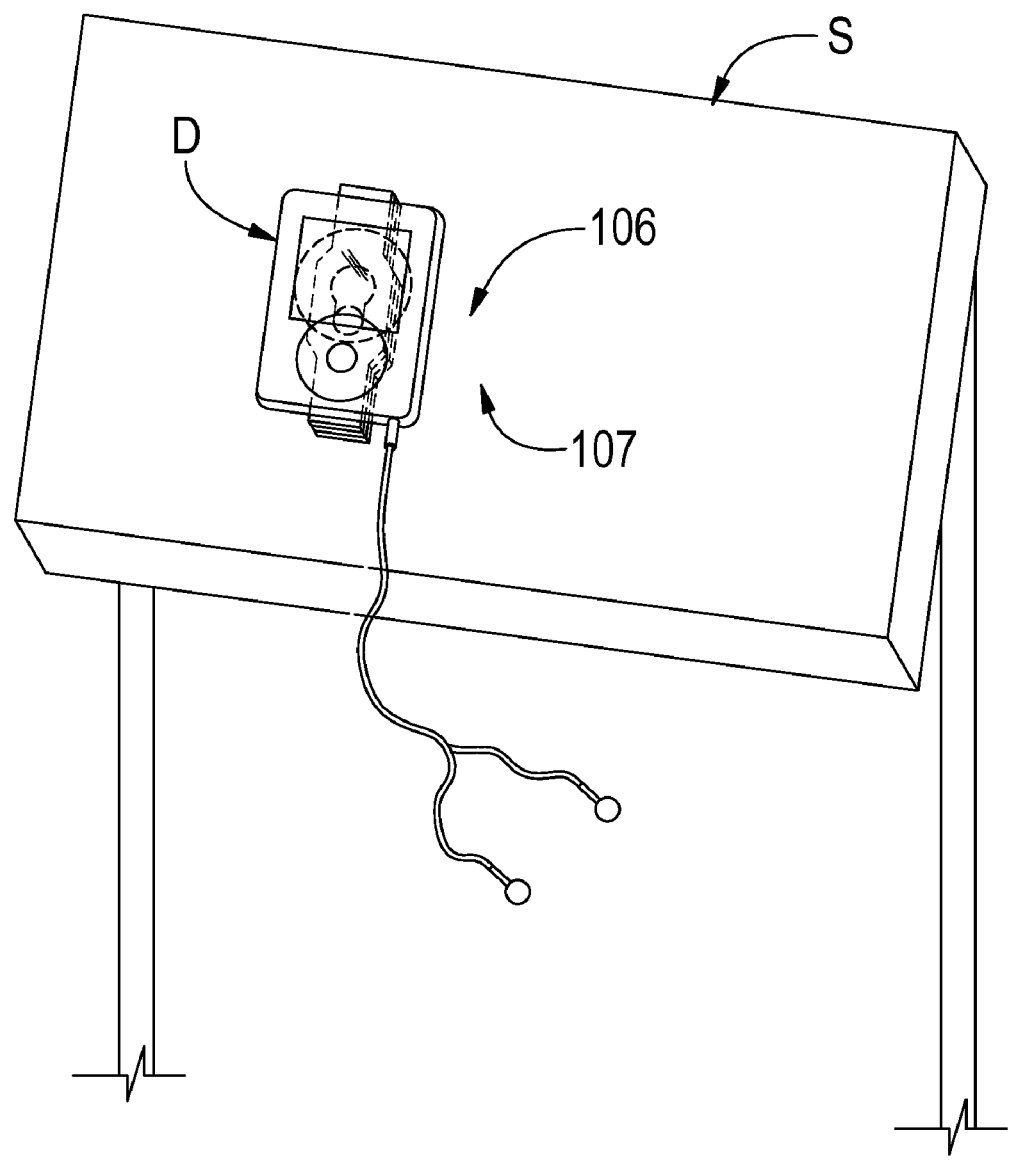

FIGS. 11-13 show certain embodiments of a portable device holder in use, mounted to a surface utilizing suction. A display screen of a piece of cardio-exercise equipment is used as an example of a usable surface, however, this example is not intended to limit the scope of the variety of surfaces on which the portable device holder can be mounted. One of ordinary skill in the art will understand that a variety of attachments may be substituted for the mounting suction cup 108. For example, hook-and-loop fasteners may be used to removably attach the mount side of an embodiment of the portable device holder to a selected surface. In addition, a more permanent attachment of the present device may be desired. In this case, an adhesive such as double-sided tape could be applied between the mounting suction cup and the surface. Alternately, the retaining clip itself may be used to removably attach an embodiment of the portable device holder 100 to the surface without the need to use the mounting suction cup.

FIG. 11 is a side perspective of an embodiment of a portable device holder 100 utilizing the small, removable suction cup 101 as shown in FIG. 8. The device or device case D may be secured to this embodiment of the portable device holder 100 utilizing suction created by the small, removable suction cup 101, or through any other suitable securing mechanism. The portable device holder 100 may be attached to the surface S utilizing suction created by the mounting suction cup 108. This embodiment of the portable device holder may be adjusted to a desired viewing angle by action of the ball-and-socket joint.

FIG. 12 is a side perspective of an embodiment of a portable device holder 100 in use with a device or device case D equipped with a clip C as described by FIG. 10. The clip C may be interlocked with the device side of the clip 106 of the portable device holder 100 securely removably attaching the device to the portable device holder, and the portable device holder 100 may be attached to the surface S utilizing suction created by the mounting suction cup 108. This embodiment of the portable device holder may be adjusted to a desired viewing angle by action of the ball-and-socket joint.

FIG. 13 is a perspective view of an embodiment of a portable device holder 100 in use, securing a portable device to a surface S, in this case, the display screen of a piece of cardio-exercise equipment. One of skill in the art will recognize that embodiments of the portable device holder may be attached to a variety of surfaces to provide a desired viewing angle to a display of a portable device without departing from the scope of the present invention.

Figure 14:
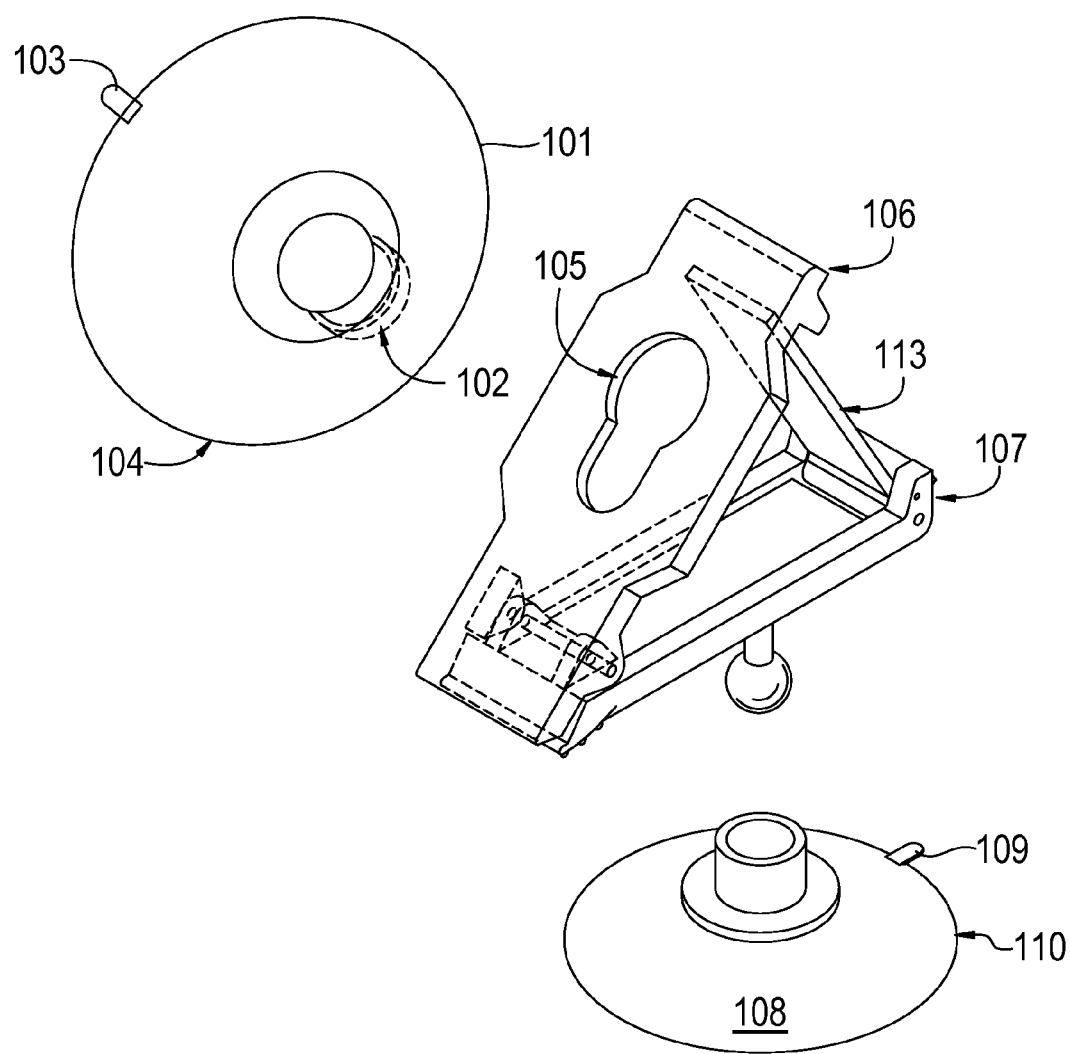
FIG. 14 depicts a perspective view of an embodiment of the present invention wherein the ends of device side and the mount side opposite the hinge are propped apart by a movable propping arm to adjust the orientation of the device side relative to the mount side.

FIG. 14 displays an embodiment of a portable device holder in which additional adjustability of the portable device or device case may be provided. To provide additional adjustability of the orientation of the display of the portable device to a desired viewing angle, the retaining clip of the portable device holder may be provided with a movable propping arm 113 that can used for selectably propping the retaining clip in an open position against the biasing means to adjust the orientation of the selected one of a portable device or a portable device case relative to the first surface. When stowed, the propping arm may be stowed alongside either the mount side 107 or the device side 106 so that the biasing means may bias the retaining clip in a closed position. When deployed, the propping arm may prop apart the ends of the mount side 107 and the device side 106 of the retaining clip to overcome the biasing force of the biasing means. As shown in FIG. 14, when deployed, the propping arm 113 may form a substantially triangular shape with the device side 106 and the mount side 107 of the retaining clip to adjust the orientation of the device side 106 to provide a desired viewing angle to an attached device or device case.

As demonstrated in the description and various drawings, among other aspects and features, the present invention meets the needs of portable device users who currently lack the means of conveniently viewing the displays on their devices while engaged in various activities. The present invention in various embodiments employs features, such as versatility and portability, in a product that is compact, adjustable and easy to use.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A portable holder for a portable device, comprising:
   a first retaining clip for removably attaching the portable holder to an object, the first retaining clip comprising a first end, a mount side, a device side, and a hinge pivotably coupling the mount side to the device side proximate the first end of the first retaining clip;
   a first suction cup adjustably mounted to the mount side, the first suction cup for removably attaching the portable device holder to a first surface, the adjustable mounting for adjusting the orientation of the portable device holder relative to the first surface; and
   a second suction cup removably mounted to the device side for removably attaching the portable device holder to a selected one of a portable device or a portable device case.

2. The portable holder of claim 1, wherein the second suction cup is removably attached to a selected one of a portable device case or a portable device, thereby removably coupling the selected one of a portable device case or a portable device to the first surface.

3. The device holder of claim 1, wherein the adjustable mounting of the first suction cup provides a user-selected viewing angle to a front surface of the portable device.

4. A universal portable device holder, comprising:
   a first retaining clip for removably attaching the portable device holder to an object, the first retaining clip comprising a first end, a mount side, a device side, and a hinge pivotably coupling the mount side to the device side proximate the first end of the first retaining clip;
   a first suction cup adjustably mounted to the mount side, the first suction cup for removably attaching the portable device holder to a first surface, the adjustable mounting for adjusting the orientation of the portable device holder relative to the first surface; and
   the device side having a cut-out section for alternately receiving a flange from a selected one of a second suction cup, a portable device, or a portable device case, so that the portable device holder is not limited to use with a single type of device or device case.

5. The portable device holder of claim 4, wherein the first suction cup is adjustably mounted to the mount side by a ball-and-socket joint.

* * * * *